July 9, 1957 T. E. CURTIS 2,798,997
FREQUENCY REGULATED POWER SUPPLY
Filed Aug. 10, 1953 2 Sheets-Sheet 1

INVENTOR.
THOMAS E. CURTIS
BY
William P. Rame
ATTORNEY

INVENTOR.
THOMAS E. CURTIS
BY William R. Lane
ATTORNEY

United States Patent Office 2,798,997
Patented July 9, 1957

2,798,997
FREQUENCY REGULATED POWER SUPPLY

Thomas E. Curtis, Downey, Calif., assignor to North American Aviation, Inc.

Application August 10, 1953, Serial No. 373,103

11 Claims. (Cl. 318—318)

This invention relates to a power supply which furnishes an output of precision frequency.

Precise supply frequency is desirable to operate synchronous devices such as synchronous gyros or synchronous timing motors. In obtaining close servo control of the output frequency of an alternator, several difficulties are encountered. The regulator must quickly detect any change in the output frequency and provide positive drive information to correct for the variation. Control units often assume large proportions in comparison to the frequency generating device. In some instances, frequency control is attempted by setting fixed circuit conditions. Frequency drift still occurs, however, because of the variation of circuit parameters due to changes in such factors as temperature, load, or power factor.

It is therefore an object of this invention to provide an improved frequency regulator.

It is another object of this invention to provide a power supply which is slaved to a reference oscillator and has a minimum of frequency drift.

It is another object of this invention to provide a frequency regulator having a minimum of electrical apparatus.

It is another object of this invention to provide a frequency regulator that is reliable and requires little maintenance.

It is a further object of this invention to provide automatic frequency regulation with very little time lag.

Figure 1:
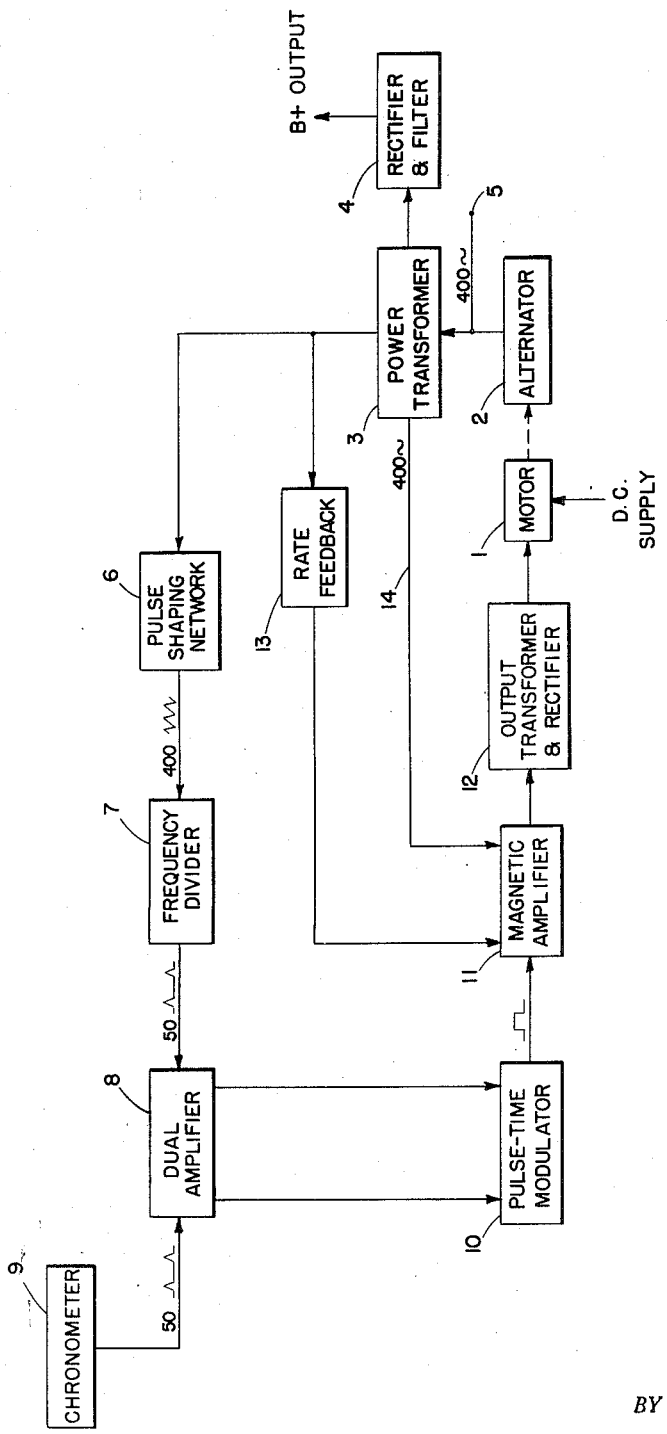
Figure 2:
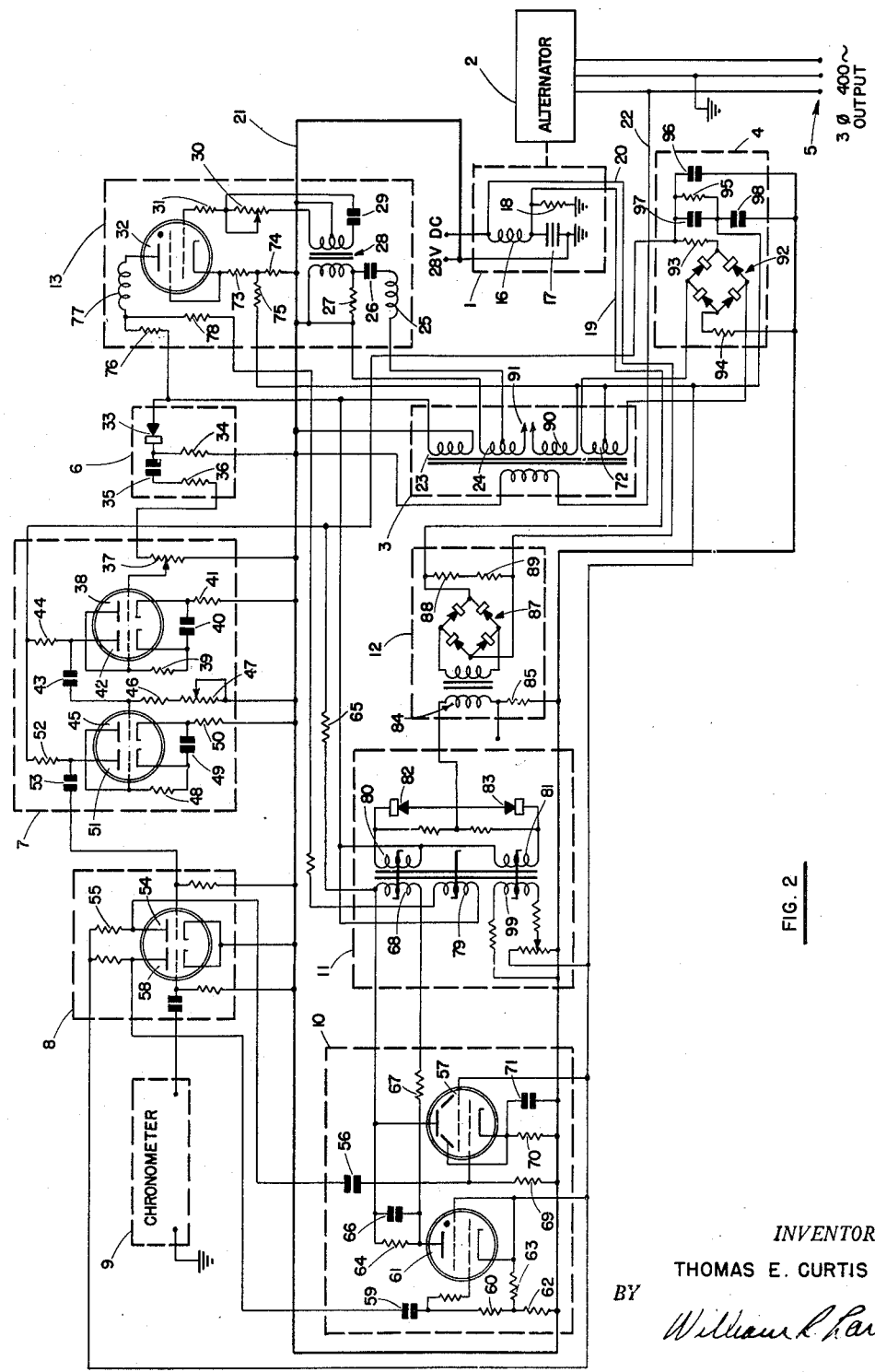

Other objects of invention will become apparent from the following description taken in connection with the accompanying drawings, in which Fig. 1 is a block diagram of the device of the invention; and Fig. 2 is a schematic diagram of the invention.

Referring now to the block diagram of Fig. 1, D.-C. motor 1 receives part of its power from a D.-C. source, as indicated. Alternator 2 driven by motor 1 provides an inverter having an alternating output of, for example, 400 cycles. Inasmuch as A.-C. and D. C. power is needed at various points in the circuit, part of the output of the alternator is directed, accordingly, to transformer 3 and through rectifier and filter 4. The frequency regulated output is supplied at terminal 5. One terminal of power transformer 3 provides the alternator frequency to be regulated, to pulse shaping network 6.

Pulse shaping network 6 forms the A.-C. output into pulses, and frequency divider 7 reduces the output frequency to a submultiple which, after passing through dual amplifier 8, is compared with the signal from an oscillator or precise chronometer 9, which signal also passes through amplifier 8. Amplifier 8 drives pulse time modulator 10. The pulse from part of amplifier 8, originating in the chronometer, acts to fire a thyratron which is also termed a grid-controlled gas rectifier. A corresponding pulse from the other part of amplifier 8, originating in the frequency divider, acts to deionize the thyratron and terminates the output of modulator 10. The output of pulse time modulator 10 is therefore dependent on the time interval between the initiating chronometer pulse and the terminating alternator pulse. The output of pulse time modulator 10 drives magnetic amplifier 11 whose output passes through output transformer and rectifiers 12. The output is then connected to the shunt field of motor 1. Thus, the farther alternator 2 lags the chronometer, the less field current is produced by magnetic amplifier 11, which causes D.-C. motor 1 to increase speed. In further explanation, increased control current in the control windings of the magnetic amplifier, caused by the alternator lagging, reduces the output of the magnetic amplifier, which causes the motor field to become weaker, which brings the motor up to speed. If the motor overspeeds, the interval between the initiating pulse and the terminating pulse is lessened and the conduction time of the thyratron is reduced. The magnetic amplifier, upon receiving less control current from the thyratron, increases its output current to the field of motor 1, causing motor 1 to slow down.

In order to provide closer control and to prevent "hunting," a rate feedback circuit 13 connects the output of alternator 2 to magnetic amplifier 11. This provides fast response by the motor when relatively fast correction of frequency is required. Line 14 provides alternator frequency to excite magnetic amplifier 11.

In the schematic diagram of Fig. 2, the shunt field 16 of motor 1 is connected through a carbon pile speed regulator 17 to ground. Resistor 18 parallels regulator 17. Shunt field 16 is excited by an external D.-C. supply as shown. Further, the shunt field 16 receives power through lines 19 and 20 which provide control of the motor speed as will be subsequently explained. A common ground connection is made to a ground bus 21 for both motor and alternator.

The alternator 2 is three phase, but only a single phase is needed to provide regulation. Consequently, the ground, or bus, provides one lead and line 22 provides the other to drive shielded power transformer 3. The first secondary winding 23 of transformer 3 provides 400 cycle input to pulse shaping network 6, supply voltage for the magnetic amplifier 11, the plate voltage for the rate feedback circuit 13. The second secondary winding 24 provides a 400 cycle input signal to a series L—C circuit of inductance 25 and capacitance 26. In conjunction with resistor 27, these elements are connected to the primary of transformer 28. The output of transformer 28 is connected through capacitor 29, variable resistor 30, and resistor 31 to the control grid of thyratron 32. The output of thyratron 32 is thus dependent on the frequency deviation of the inverter, which is equivalent to the rate of change of the inverter phase angle with respect to chronometer 9. If the frequency decreases, the average current through thyratron 32 increases, since the phase angle of the grid voltage advances with respect to the plate voltage, due to phase shift with frequency in inductance 25 and capacitor 26. Thyratron 32 is initially adjusted by means of resistor 30 to fire in the last portion of each half cycle of A.-C. potential, so that changes in average plate current are large for small changes in phase angle of grid voltage. In the pulse shaping network 6, diode 33 receives the 400 cycle sine wave from winding 23. Diode 33 is connected through resistance 34 to ground, as is capacitor 35. Resistor 36 connected to capacitor 35 provides the output of the pulse shaping network to frequency divider 7. Potentiometer 37 has impressed across it the output of pulse shaping network 6. The wiper of potentiometer 37 provides the output to control triode 38. The plate circuit of triode 38 is connected through resistor 39 and capacitor 40 to the cathode of triode 38. The cathode is connected through resistor 41 to ground. The cathode of triode 42 is connected through resistor 39 to the plate circuit of triode 38 and the grid of triode 42 is connected directly to the plate of triode 38. Triodes 38 and 42 are indicated as being contained within the same envelope. The plate output of triode 42 appears across capacitor 43 and resistance 44 which connects the plate of triode 42 to the positive supply. The circuit thus far is a frequency divider in which the pulse shaping output of network 6 drives triode 38 and, after a sufficient number of pulses, depending on the setting of potentiometer wiper 37, causes triode 42 to conduct. When triode 42 conducts, a voltage is impressed across capacitor 43 and on the grid of triode 45. The grid of triode 45 is connected through resistor 46 and potentiometer 47 to ground. Potentiometer 47 determines the potential at which the grid is operated. In the same manner, the plate of triode 45 is connected to the cathode through resistor 48 and capacitor 49. The cathode is connected through resistor 50 to ground. The cathode of tube 51 is connected to the plate of tube 45 through resistor 48. The grid of tube 51 is connected directly to the plate of tube 45. The plate supply of tube 51 is obtained through resistor 52. The plate output of tube 51 is taken through capacitor 53.

The frequency-divided, pulse-formed alternator output is then fed to the grid of tube 54 of dual amplifier 8. The plate supply is received through resistor 55. The plate output passes through capacitor 56 to the grid of beam power pentode 57. The other triode 58 of dual amplifier 8 receives a pulse from a time standard, or chronometer, 9. Capacitor 59 and resistance 60 couple the amplified pulse into grid controlled gas rectifier thyratron 61. The control grid of thyratron 61 is connected through resistances 60 and 62 to ground. It is also connected through resistance 63 to the cathode and suppressor grid. Plate supply for the thyratron is obtained through resistor 64 and resistor 65. Capacitor 66 is connected in parallel with resistor 64. The output of the thyratron 61 is obtained across resistor 64 through resistor 67. This output drives control winding 68 of the magnetic amplifier. Tube 57 receives the pulse from amplifier 8 which is to be compared with the time standard pulse received by thyratron 61. The cathode of tube 57 is connected through resistor 70 and capacitance 71, which are in parallel, to ground. The screen grid of tube 57 is connected to approximately 150 volts D.-C. by means of a center tap on the load winding 72 of transformer 3. The cathode of tube 57 is connected directly to the suppressor grid. The plate supply of tube 57 is received through resistor 65.

In operation, the pulse time modulator is initiated by the chronometer pulse which fires thyratron 61 which feeds control current to control winding 68 of the magnetic amplifier. As soon as a pulse is received from the frequency divider 7 through amplifier 8, tube 57 conducts and draws sufficient current through resistor 65 to lower the plate voltage of thyratron 36 to where the thyratron is quenched. Therefore, in the comparison of the two pulses, the pulse time modulator furnishes an output dependent on phase difference between the chronometer pulse and the pulse formed from the alternator output. If the frequencies are exactly in phase, thyratron 36 will be stopped as soon as it is fired, and no control current will flow. If the two pulses are out of phase considerably (caused by the alternator lagging), a large amount of current is furnished to the control winding 68 of the magnetic amplifier. The average D.-C. current in control winding 68 of the magnetic amplifier is thus proportional to the time difference between the time signal and a submultiple of the alternator frequency. If a submultiple frequency of 50 C. P. S. is used, the steady-state operating condition of the pulse time modulator causes the inverter to operate somewhere within the range of 0 to .02 second behind the reference frequency. As mentioned previously, in order to provide stability and a better time response, a rate feedback circuit 13 is connected to drive magnetic amplifier 11.

Referring to Fig. 2, from winding 24 is received the inverter frequency signal which is passed through inductance 25 and capacitance 26 which form an L—C series circuit tuned to the inverter frequency. Transformer 28 has a resistor 27 connected across its primary. The secondary of transformer 28 has its center tap connected to ground. One on side, the secondary is connected through potentiometer 30 and resistor 31 to the control grid of thyratron 32 and on the other side, capacitor 29 connects to resistor 31. The secondary of transformer 28, capacitor 29, and potentiometer 30 form an adjustable phase shift circuit which detects the fast changes of the inverter frequency, as previously described. The screen grid of thyratron 32 is connected directly to the cathode which, in turn, is connected through resistors 73 and 74 to ground. The cathode is also connected through resistors 73 and 75 to the screen supply. The plate voltage of the thyratron is received through resistor 76 and inductance 77. The plate output of the thyratron is obtained at the common point of resistor 76 and inductance 77 through resistance 78. This output provides for rate control and acts to drive a second control winding 79 of the magnetic amplifier.

Magnetic amplifier 3 consists of phase lag control winding 68, previously mentioned, and a rate control winding 79, previously mentioned, and a third control winding 99 which is biased and sets the operating condition of the magnetic amplifier. Load windings 80 and 81 are conventionally connected through diodes 82 and 83 to provide an output to transformer 84. The primary of transformer 84 is connected through resistor 85 to ground. The secondary of transformer 84 is connected through full-wave bridge rectifier 87 to provide a full-wave rectified output across load resistors 88 and 89. The full-wave rectified output of bridge rectifier 87 is connected to the shunt field 16 of the motor 1, and whenever current decreases in this full-wave rectifier the field of the motor will be weakened, holding the motor up to a speed which gives the regulated frequency, or will bring it up to such a speed.

Transformer winding 90 is a filament winding provided for thyratron 61. The filaments (not shown) of all other tubes are connected to ground on one side and to the high side 91 of winding 24.

The plate supply for tubes 38, 42, 45, 51, 57, and 61 is supplied from winding 72, rectified by full-wave bridge rectifier 92, and filtered by resistors 93 and 94, parallel resistor 95, and capacitors 96, 97, and 98.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a frequency regulator, an inverter, a pulse shaping network, and a frequency divider in circuit with said inverter, a pulse frequency reference, a modulator comprising a thyratron whose output is initiated by said frequency reference and terminated by the pulse-shaped, frequency-divided output of said inverter, said modulator connected to control the speed of said inverter.

2. In a frequency regulator, an inverter, a pulse shaping network, and a frequency divider in circuit with said inverter, a pulse frequency reference, a thyratron whose output is initiated by said frequency reference and terminated by the pulse-shaped, frequency-divided output of said inverter, a feedback circuit whose output is dependent upon the frequency of said inverter, said thyratron and said feedback circuit connected to control the speed of said inverter.

3. In a frequency regulated power supply, a motor, an alternator, a pulse-shaping network and a frequency divider in circuit with said alternator, a frequency reference, a thyratron whose output is initiated by said frequency reference and terminated by the pulse-shaped frequency-divided output of said alternator, and an amplifier connected to receive the output of said thyratron and connected to control the speed of said motor.

4. In a frequency regulator, a motor, an alternator, a pulse-shaping network, a frequency divider and an amplifier in circuit with said alternator, a pulse frequency reference, an amplifier connected to said frequency reference, a thyratron whose output is initiated by a pulse from said frequency reference and terminated by the amplified pulse-shaped frequency-divided output from said alternator, and a magnetic amplifier to control the speed of said motor in accordance with the output of said thyratron.

5. In a frequency regulated power supply, an alternator, a motor driving said alternator, a frequency divider, pulse shaper and first amplifier in the output circuit of said alternator, a pulse frequency reference, a second amplifier connected to the output of said reference, a thyratron whose conduction is initiated by each pulse output of said second amplifier and terminated by each pulse output of said first amplifier, lowering the plate voltage of said thyratron, a magnetic amplifier controlling the speed of said motor, a feedback circuit whose output depends on the frequency of said alternator, said feedback circuit and said thyratron connected to control the output of said magnetic amplifier.

6. In a frequency regulated power supply, a motor, an alternator driven by said motor, a frequency reference, a pulse shaper, a frequency divider and amplifier connected to receive the output of said alternator, a thyratron whose conduction is initiated by the pulse of said frequency reference, and means for reducing the plate voltage of said thyratron in accordance with the pulse of said amplifier, a magnetic amplifier controlled by the output of said thyratron and controlling the speed of said motor.

7. In a frequency control system for A.-C. generating means, a frequency reference, a gas rectifier whose grid is controlled by said frequency reference and whose anode to cathode potential is controlled by the output of said generating means, a D.-C. source connected to supply cathode to anode potential of said gas rectifier and means for controlling the speed of said generating means in accordance with the output of said gas rectifier.

8. In a frequency control system, A.-C. generating means, a frequency reference, a thyratron whose grid is connected to receive the output of said frequency reference, a D.-C. source connected to supply the anode to cathode potential of said thyratron, means for dropping the cathode to anode potential of said thyratron in accordance with the output of said A.-C. generating means to terminate the conduction of said thyratron, and means for controlling the speed of said generating means in accordance with the output of said thyratron.

9. In an electronic circuit, a motor, an alternator driven by said motor, a frequency reference, a controlled gas rectifier, said frequency reference connected to initiate conduction of said rectifier, a D.-C. source connected to supply the cathode to anode potential of said controlled gas rectifier, said alternator connected to further control the anode to cathode potential of said controlled gas rectifier to terminate conduction, the output of said controlled gas rectifier being connected to control the speed of said motor.

10. The combination recited in claim 9 wherein said controlled gas rectifier is a grid-controlled thyratron.

11. In an electronic circuit, a motor, an alternator driven by said motor, a frequency reference, a controlled gas rectifier, said frequency reference connected to initiate conduction of said gas rectifier, a D.-C. source connected to supply the cathode to anode potential of said gas rectifier, said alternator connected to further control the anode to cathode potential to terminate conduction of said gas rectifier, a feedback circuit whose output is dependent on the frequency of said alternator, means responsive to said feedback circuit and the output of said controlled gas rectifier to control the speed of said motor.

References Cited in the file of this patent

UNITED STATES PATENTS

| | | |
|---|---|---|
| 2,088,495 | Swedlund | July 27, 1937 |
| 2,090,951 | Schlesinger | Aug. 24, 1937 |
| 2,273,978 | Montgomery | Feb. 24, 1942 |
| 2,376,421 | Drake | May 22, 1945 |
| 2,460,456 | Hurley | Feb. 1, 1949 |
| 2,465,110 | Mead | Mar. 22, 1949 |
| 2,476,849 | Ergen | July 19, 1949 |
| 2,490,562 | Van Dorsten | Dec. 6, 1949 |
| 2,622,236 | White | Dec. 16, 1952 |

FOREIGN PATENTS

| | | |
|---|---|---|
| 570,094 | Great Britain | June 21, 1945 |